US012775625B2

(12) United States Patent
Wang et al.

(10) Patent No.: US 12,775,625 B2
(45) Date of Patent: Oct. 27, 2026

(54) GRAPH DATA QUERY METHODS, APPARATUSES, AND DEVICES

(71) Applicant: Alipay (Hangzhou) Information Technology Co., Ltd., Hangzhou (CN)

(72) Inventors: Tao Wang, Hangzhou (CN); Bingye Liu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/962,649

(22) Filed: Nov. 27, 2024

(65) Prior Publication Data

US 2025/0086188 A1 Mar. 13, 2025

Related U.S. Application Data

(63) Continuation of application No. PCT/CN2023/105863, filed on Jul. 5, 2023.

(30) Foreign Application Priority Data

Jul. 8, 2022 (CN) ........................ 202210796967.X

(51) Int. Cl.
*G06F 16/2457* (2019.01)
*G06F 16/248* (2019.01)
*G06F 16/28* (2019.01)

(52) U.S. Cl.
CPC ...... *G06F 16/24575* (2019.01); *G06F 16/248* (2019.01); *G06F 16/284* (2019.01)

(58) Field of Classification Search
CPC ............. G06F 16/24575; G06F 16/248; G06F 16/284; G06F 16/2393; G06F 16/2453;
(Continued)

(56) References Cited

U.S. PATENT DOCUMENTS

2004/0030677 A1* 2/2004 Young-Lai ........ G06F 16/24526
707/999.002
2008/0147598 A1 6/2008 Nica
(Continued)

FOREIGN PATENT DOCUMENTS

CN 102053989 A 5/2011
CN 105718455 A 6/2016
(Continued)

OTHER PUBLICATIONS

Extended European Search Report in European Appln. No. 23834884.1, mailed on Jul. 17, 2025, 12 pages.
(Continued)

*Primary Examiner* — Phong H Nguyen
(74) *Attorney, Agent, or Firm* — Fish & Richardson P.C.

(57) ABSTRACT

A computer-implemented method for graph data query includes receiving a query request for graph data. A search start node in the graph data is determined. Starting from the search start node and along an edge in the graph data, the graph data is searched for a target node that meets the query request. Based on query data that needs to be returned in response to the query request, whether the target node needs to be materialized is determined. If the target node does not need to be materialized, corresponding query data is returned as returning corresponding query data.

18 Claims, 3 Drawing Sheets

(58) Field of Classification Search
CPC ...... G06F 16/9024; G06F 16/28; G06F 16/51; G06F 16/53; Y02D 10/00
USPC ......................................... 707/769, 797, 798
See application file for complete search history.

(56) References Cited

U.S. PATENT DOCUMENTS

| | | | | |
|---|---|---|---|---|
| 2009/0112680 | A1* | 4/2009 | Dovrath | G06Q 30/08 705/26.1 |
| 2011/0106843 | A1 | 5/2011 | Pan et al. | |
| 2014/0012840 | A1* | 1/2014 | Han | G06F 16/248 707/723 |
| 2014/0025702 | A1* | 1/2014 | Curtiss | G06Q 10/40 707/769 |
| 2014/0129493 | A1* | 5/2014 | Leopold | G06F 16/26 707/603 |
| 2014/0282364 | A1* | 9/2014 | Woodward | G06F 8/34 717/105 |
| 2021/0109930 | A1 | 4/2021 | Petride et al. | |
| 2022/0179868 | A1 | 6/2022 | Mortazavi et al. | |

FOREIGN PATENT DOCUMENTS

| | | | |
|---|---|---|---|
| CN | 106250457 | A | 12/2016 |
| CN | 106779150 | A | 5/2017 |
| CN | 108932286 | A | 12/2018 |
| CN | 111597209 | A | 8/2020 |
| CN | 112286953 | A | 1/2021 |
| CN | 113515539 | A | 10/2021 |
| CN | 114020781 | A | 2/2022 |
| CN | 114547115 | A | 5/2022 |
| CN | 114880504 | A | 8/2022 |
| WO | 2019196543 | A1 | 10/2019 |

OTHER PUBLICATIONS

Rice et al., "Exact Graph Search Algorithms for Generalized Traveling Salesman Path Problems," Paper, Presented at the SEA 2012: 11th International Symposium on Experimental Algorithms, Bordeaux, France, Jun. 2012; Lecture Notes in Computer Science, Experimental Algorithms, 2012, 7276:344-355.

International Preliminary Report on Patentability in International Appln. No. PCT/CN2023/105863, mailed on Jan. 23, 2025, 12 pages (with English translation).

International Search Report and Written Opinion in International Appln. No. PCT/CN2023/105863, mailed on Oct. 27, 2023, 14 pages (with English translation).

Zhang et al., "Online selection algorithm of materialized Web View," Journal of Southeast University (Natural Science Edition), Jan. 2007, 37(1):1-4 (with English abstract).

* cited by examiner

GRAPH DATA QUERY METHODS, APPARATUSES, AND DEVICES

CROSS-REFERENCE TO RELATED APPLICATIONS

This application is a continuation of PCT Application No. PCT/CN2023/105863, filed on Jul. 5, 2023, which claims priority to Chinese Patent Application No. 202210796967.X, filed on Jul. 8, 2022, and each application is hereby incorporated by reference in its entirety.

TECHNICAL FIELD

This specification relates to the field of big data technologies, and in particular, to graph data query methods, apparatuses, and devices.

BACKGROUND

A conventional database is a relational database, refers to a database that uses a relational model to organize data, and stores data in rows and columns. With rapid development of graph computing technologies, big data technologies, and machine learning technologies, a graph database is also widely used. Graph data generally include a plurality of nodes and an edge between nodes. A node represents a specified object, for example, a user or a service feature. An edge represents a relationship between two nodes connected by the edge, for example, a transaction that has occurred between the two nodes, or a friend or relative relationship between the two nodes.

Graph data queries in the graph database are important user needs. The user often needs to learn which qualified nodes (referred to as target nodes) are included in specified graph data in the graph database, for example, query a target node whose distance (generally referred to as the shortest distance) from a specified point is a specified hop or within a specified hop.

Currently, when a query is performed hop by hop in a graph database (for example, a query is performed in a Neo4j graph database based on a Cypher statement), the query expands along an edge from a specified search start node, to obtain a neighbor node of the search start node, and then obtain another neighbor node of the neighbor node. This step is repeated until a target node is found. A current node is materialized when the neighbor node is obtained. Therefore, a large quantity of materialization processes are introduced. Materialization here is obtaining, based on an index, value information (including some specific service attribute values, such as specific related service data and neighbor node information) that is of the specified node and stored in a memory or a disk. The materialization processes are time-consuming.

Based on this, a more efficient graph data query solution is needed.

SUMMARY

One or more embodiments of this specification provide graph data query methods, apparatuses, and devices, and storage media, to resolve the following technical problem: A more efficient graph data query solution is needed.

To resolve the above-mentioned technical problem, one or more embodiments of this specification are implemented in this way.

The graph data query method provided in one or more embodiments of this specification includes: receiving a query request for graph data; determining a search start node in the graph data; searching, starting from the search start node and along an edge in the graph data, the graph data for a target node that meets the query request; determining, based on query data that need to be returned in response to the query request, whether the target node needs to be materialized; and if no, returning corresponding query data when the target node does not need to be materialized.

The graph data query apparatus provided in one or more embodiments of this specification includes: a request receiving module, configured to receive a query request for graph data; a start determining module, configured to determine a search start node in the graph data; an edge searching module, configured to search, starting from the search start node and along an edge in the graph data, the graph data for a target node that meets the query request; a materialization determining module, configured to determine, based on query data that need to be returned in response to the query request, whether the target node needs to be materialized; and a result returning module, configured to: if no, return corresponding query data when the target node does not need to be materialized.

The graph data query device provided in one or more embodiments of this specification includes: at least one processor; and a storage communicatively connected to the at least one processor, where the storage stores instructions that are capable of being executed by the at least one processor, and the instructions are executed by the at least one processor, so that the at least one processor is capable of: receiving a query request for graph data; determining a search start node in the graph data; searching, starting from the search start node and along an edge in the graph data, the graph data for a target node that meets the query request; determining, based on query data that need to be returned in response to the query request, whether the target node needs to be materialized; and if no, returning corresponding query data when the target node does not need to be materialized.

One or more embodiments of this specification provide a nonvolatile computer storage medium. The medium stores computer-executable instructions, and the computer-executable instructions are set to: receive a query request for graph data; determine a search start node in the graph data; search, starting from the search start node and along an edge in the graph data, the graph data for a target node that meets the query request; determine, based on query data that need to be returned in response to the query request, whether the target node needs to be materialized; and if no, return corresponding query data when the target node does not need to be materialized.

The above-mentioned at least one technical solution used in one or more embodiments of this specification can achieve the following beneficial effects: Whether a target node needs to be materialized is actively determined based on query data that need to be returned in response to a query request, and not all target nodes and intermediate nodes are materialized blindly based on a currently-used standard procedure. For example, materialization is performed only when the query data that need to be returned depend on value information of the target node, and the target node is not materialized when only query data that do not depend on the value information of the target node need to be returned, for example, only a quantity of the target nodes needs to be returned, so that especially when there are a large quantity of target nodes, time consumed by a large quantity of materialization operations can be saved, and this improves graph data query efficiency. In addition, optionally, the intermediate node is actively not materialized, so that more time consumed by materialization operations may be saved, and graph data query efficiency is improved.

BRIEF DESCRIPTION OF DRAWINGS

To describe the technical solutions in embodiments of the specification more clearly, the following briefly describes the accompanying drawings required for describing the embodiments. Clearly, the accompanying drawings in the following description show merely some embodiments described in this specification, and a person of ordinary skill in the art can still derive other drawings from these accompanying drawings without creative efforts.

DESCRIPTION OF EMBODIMENTS

Embodiments of this specification provide graph data query methods, apparatuses, and devices, and storage media.

To enable a person skilled in the art to better understand the technical solutions in the specification, the following clearly and comprehensively describes the technical solutions in embodiments of this specification with reference to the accompanying drawings in embodiments of this specification. Clearly, the described embodiments are merely some rather than all of the embodiments of this specification. All other embodiments obtained by a person of ordinary skill in the art based on the embodiments of this specification without creative efforts shall fall within the protection scope of this application.

As mentioned in the background, in some standard processing procedures, a large quantity of time-consuming materialization (or can be referred to as concretization) operations may occur. A relational database also has a problem that a large quantity of materialization operations consume a large amount of time. This specification provides a corresponding solution. It should be noted that materialization in the relational database is different from materialization in a graph database.

For the graph database, materialization is obtaining, based on an index, value information (including some specific attribute values of the node, for example, a user name, an age and an address, a member class, a transaction quantity, and a latest order) of a node stored in a memory or a disk, where the node is a node included in graph data.

For a column-type relational database, materialization is converting data stored in columns into rows for ease of read and understanding. However, if all data are preferentially materialized during a query, advantages of column-type storage are completely wasted. Therefore, a delayed materialization policy can be used. For example, filtering is directly performed on column-type data, a bit map is used to perform a bit-wise AND operation on filtered column-type data, and finally, a result and a field that needs to be returned in the query are projected and then materialized.

For a row-type relational database, materialization is materializing a view, that is, data that meet a certain condition are stored as a temporary table for subsequent use, which is an optimization of a sub-query. In this case, materialization can be eliminated by combining sub-queries.

However, the above-mentioned solutions are for a relational model and are not applicable to a graph model, and therefore cannot be used in the graph database for querying the graph data. Therefore, this specification further provides a query solution applicable to graph data, to resolve a problem that a large quantity of materialization operations affect graph data query efficiency.

Figure 1:
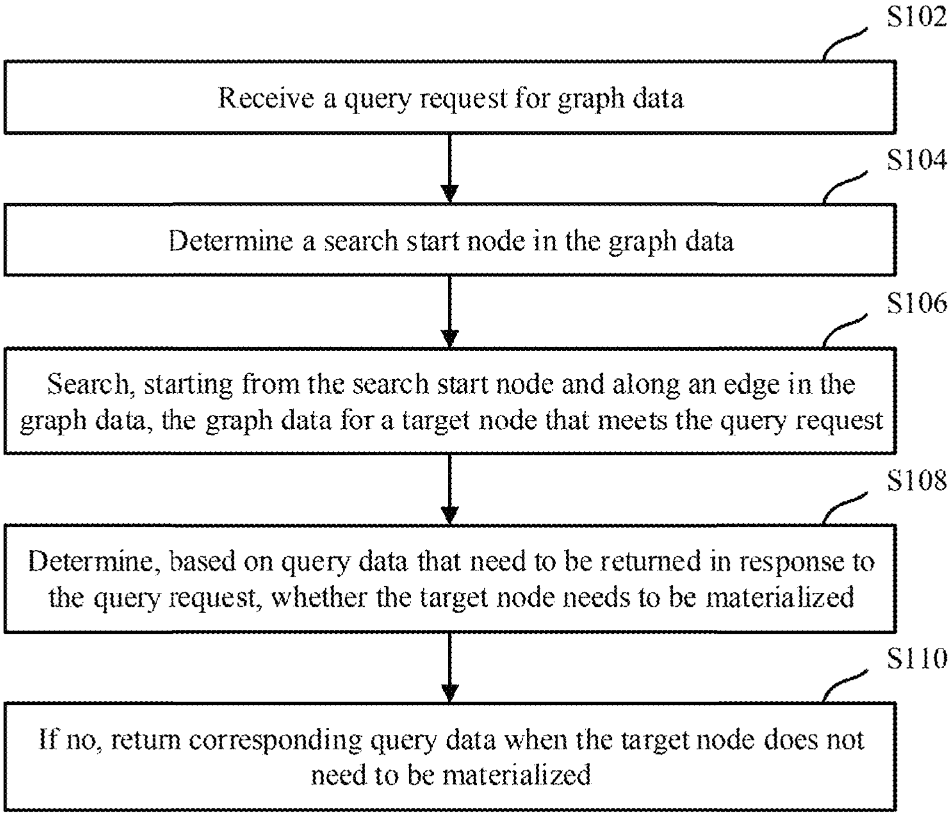
FIG. 1 is a schematic flowchart illustrating a graph data query method, according to one or more embodiments of this specification.

FIG. 1 is a schematic flowchart illustrating a graph data query method, according to one or more embodiments of this specification. The method can be applied to graph databases of different service fields, and the service fields include, for example, an electronic payment service field, an e-commerce service field, an instant messaging service field, a game service field, and a public service field. The procedure can be performed on a device that stores graph data in these fields. A typical example is a graph database server, etc. . . . Some input parameters or intermediate results in the procedure allow manual intervention adjustment to help improve accuracy.

The procedure in FIG. 1 can include the following steps S102 to S110.

S102: Receive a query request for graph data.

In one or more embodiments of this specification, the graph data includes a plurality of nodes and an edge between nodes. A node represents a specified object, for example, a user, a user feature, a service feature, and a transaction. An edge represents a relationship (mostly a service relationship) between two nodes connected by the edge, for example, a transaction that has occurred between two users, a friend or relative relationship between the two users, and a causal relationship between two service features.

In one or more embodiments of this specification, the query request is used to request to search: all nodes associated with a source node at a $k^{th}$ layer of the corresponding graph data, where the $k^{th}$ layer here represents a distance of k hops from the source node (if there is one edge connecting two nodes, a distance between the two nodes is 1 hop), and k is a positive integer not less than 1. This graph data query is referred to as a k-hop query. Specifically, for example, a node can be specified as a search start node, namely, the source node, so that the query request is used to request to search: a quantity or value information of nodes that are specified hops away from the search start node, where the node that is specified hops away from the specified node is used as a target node, and after the query, related information of the target node is returned as a response result to the query request. In a case of k-hop query, a large quantity of materialization operations are particularly involved currently. Therefore, in this solution, efficiency improvement effect is clear. Some embodiments in the following are mainly described by using a k-hop query scenario as an example. Certainly, if a materialization operation is involved in another type of query, this solution can also be used to improve efficiency.

S104: Determine a search start node in the graph data.

In one or more embodiments of this specification, one or more search start nodes can be directly specified in the query request.

When no node is specified, the search start node can be determined through excavating. For example, if it is assumed that a risk node set is to be excavated in the graph data, some nodes with high service risk can be first found, and then these nodes are used as search start nodes to search for nodes around with a close relationship. These nodes can form a risk node set.

S106: Search, starting from the search start node and along an edge in the graph data, the graph data for a target node that meets the query request.

In one or more embodiments of this specification, starting from the search start node, the searching expands hop-by-hop to the outside. If a same search start node has a plurality of edges, the searching roams to the outside from each edge. In a case of k-hop query, the searching roams to the outside to try to search for nodes at a distance of k hops as a target node that meets the query request. Specifically, for example, nodes within k hops are traversed in a depth-first traversal way, to find cach target node.

S108: Determine, based on query data (namely, at least a part of query results) that need to be returned in response to the query request, whether the target node needs to be materialized.

Figure 2:
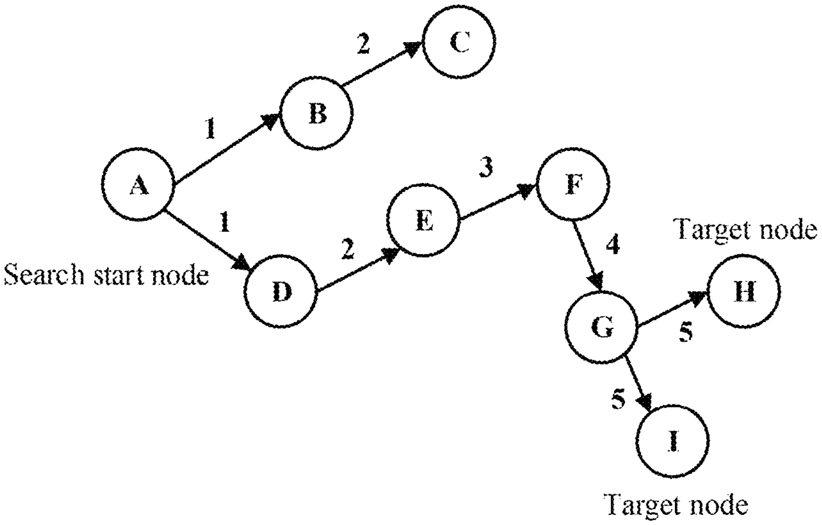
FIG. 2 is a diagram illustrating a local area of graph data, according to one or more embodiments of this specification.

In response to a k-hop query request, when searching in the graph data and expanding to the outside, some intermediate nodes are passed through before reaching the target node. For example, FIG. 2 is a simplified diagram illustrating a local area of graph data, according to one or more embodiments of this specification. A circle represents a node, an arrow edge represents a directed edge (in this example, a directed graph is used, but an undirected graph is also available), and a number marked on the edge is a corresponding quantity of hops. It is assumed that k=5, A is a search start node, and 5 hops (if there are a plurality of reachable paths, a shortest path can be used) are needed to move outward to reach the target node. In this case, nodes that are 1 hop (B and D), 2 hops (C and E), 3 hops (F), and 4 hops (G) away from the search start node are passed through, and these nodes are referred to as intermediate nodes. Nodes H and I that are 5 hops away from A can be found and used as target nodes. In a standard procedure, during roam searching, the intermediate nodes and the target nodes are materialized, and value information of the nodes can be obtained through materialization. In this case, a large quantity of time-consuming materialization operations are caused.

In one or more embodiments of this specification, in a case of k-hop query, the query data that need to be returned generally do not include related information of the intermediate node, and related information obtained by materializing the intermediate node may be only used for other purposes or cached as a backup. Therefore, the standard procedure is considered to be improved, and materialization is not performed on all the intermediate nodes, to avoid affecting query efficiency. If the related information is urgently needed, materialization of the intermediate node is restarted.

However, the situation of the target node is more complex. In response to the query request, the related information of the target node needs to be returned. However, specific information depends on an actual need of the user. If the query data that need to be returned can be obtained without materializing the target node, materialization is not performed on the target node. For example, if the query data that need to be returned in response to the query request are a quantity of target nodes, the target nodes only need to be counted, without depending on the value information of the target node. In this case, it can be determined that the target node does not need to be materialized. For another example, if the query data that need to be returned in response to the query request are whether there is a target node being hit, only a determining result needs to be returned, and the target node does not need to be materialized.

Based on this idea, for the query data that need to be returned in response to the query request, it is determined, based on whether the query data depend on the value information of the target node, whether the target node needs to be materialized. If the query data do not depend on the value information of the target node, a result of the determining is no. Optionally, on the contrary, if the query data depend on the value information of the target node (for example, the value information needs to be directly returned, or a result needs to be returned after the value information is calculated), a result of the determining is yes. Certainly, in this case, a determining result can be finally determined with reference to some other conditions. For example, if the value information is cached locally, a corresponding materialization operation can not be performed although the value information is still depended.

In one or more embodiments of this specification, after it is determined whether the target node needs to be materialized, if a result of the determining is yes, the target node is materialized to obtain the value information of the target node, and corresponding query data is returned based on the value information of the target node. In this case, the to-be-returned query data depend on the value information of the target node. For example, if the to-be-returned data include a detailed data record of each target node, the to-be-returned query data depend on the value information.

In actual applications, a case in which the query data depend on the value information of the target node can be generally limited and enumerated. Based on this, some query data types that are used to respond to the query request can be predetermined, and whether the target node needs to be materialized is determined based on whether these types are hit. In this way, difficulty of analyzing a dependency relationship is reduced, and execution efficiency of a determining process is improved.

S110: If no, return corresponding query data when the target node does not need to be materialized.

Based on the method shown in FIG. 1, whether a target node needs to be materialized is actively determined based on query data that need to be returned in response to a query request, and not all target nodes and intermediate nodes are materialized blindly based on a currently-used standard procedure. For example, materialization is performed only when the query data that need to be returned depend on value information of the target node, and the target node is not materialized when only query data that do not depend on the value information of the target node need to be returned, for example, only a quantity of the target nodes needs to be returned, so that especially when there are a large quantity of target nodes, time consumed by a large quantity of materialization operations can be saved, and this improves graph data query efficiency. In addition, optionally, the intermediate node is actively not materialized, so that more time consumed by materialization operations may be saved, and graph data query efficiency is improved.

Based on the method shown in FIG. 1, this specification further provides some specific implementations and extension solutions of the method, which are further described below.

Value information of a node may include a list of neighbor nodes of the node. In this case, when searching for the target node in the graph data, a list of neighbor nodes of each intermediate node can be used to determine a next search path, so that a materialization operation on the intermediate node in the standard procedure is more reasonable, and the materialization operation on the intermediate node tends to be retained although efficiency is reduced.

To reverse this tendency and avoid materializing the intermediate node, a path is directly searched for based on an edge, including: starting from the search start node, searching in the graph data along the edge in the graph data, and determining a next search path based on an edge that is reached in the graph data, without materializing the intermediate node connected to the edge. The edge may include identifiers of two nodes connected to the edge. The identifier is used to uniquely determine a corresponding node, is usually predefined by a developer according to a rule of a company of the developer, and can be used as a primary key of a data record corresponding to the node, instead of being considered as value information of the node.

If the identifier is considered as the value information of the node, a corresponding materialization operation needs to be performed on the edge to obtain the identifier, which is still not conducive to reducing the materialization operation. This is considered. To improve applicability of the solution, the solution is further reformed. The solution specifically includes: prebuilding one or more information simplification topology graphs for the graph data, where the information simplification topology graph includes only as few pieces of information as possible compared with original graph data (a topology of the topology graph can also be incomplete compared with an original topology represented by the graph data), for example, an identifier of a node associated with an edge. Then, when the next search path is determined, the information simplification topology graph can be obtained, and an identifier of a peer node associated with the edge that is reached in the graph data is determined based on the information simplification topology graph, so that the next search path can be determined. A determined search path or an excluded search path (for example, some paths with a loopback trend, where these paths may cause a hop decrease instead of a hop-by-hop increase), especially some partitions that determine whether the path is correct can be marked and updated to the information simplification topology graph, and may be reused for other subsequent queries to speed up the queries.

In one or more embodiments of this specification, a topology graph represented by the graph data is referred to as an original topology graph. The information simplification topology graph is another topology graph built based on the graph data, and the information simplification topology graph includes a local area in the graph data, and is used for a quick query. Further, a same information simplification topology graph is built based on a plurality of different graph data, and the information simplification topology graph includes a local area in each graph data. There can be differences between services of different graph data. A part of nodes included in the different graph data can be the same. Because services and functions concerned by the different graph data are different, nodes that are excavated and displayed by the graph data and inter-node relationships are also different. The information simplification topology graph is used as an intermediate medium, so that a certain degree of data exchange can be implemented between different graph data that are originally isolated from each other, without full integrating the data for use. This improves data sharing, so that blind points of services of different graph data are reduced; and facilitates management and access control on private data of each graph data, so that security is also ensured.

Based on this idea, specifically, for example, when the next search path is determined, if an edge reached in current graph data (namely, the graph data in S102) can be extended to the information simplification topology graph, the next search path is determined in a local area (for example, a local area corresponding to the graph data) in the information simplification topology graph. In a case in which the information simplification topology graph includes local areas in a plurality of different graph data, it can be determined whether the search path reaches a boundary of a local area in which the path is located. It is assumed that the local arca belongs to another graph data, and graph jump can be performed to jump from the local area to another area in the another graph data, to continue to determine the next search path. This helps find the target nodes more fully and reliably, and breaks a limitation on relationship excavating brought by a service corresponding to the current graph data. It can be further determined, based on a relationship between the current graph data and the another graph data, whether to perform graph jump, so that necessary graph jump can be performed more rationally. For example, it is determined, based on the relationship, whether an access control policy is met, whether a correlation exists between services of both parties, whether both parties are user-related graph data that send the query request, etc.

During actual execution, path determining is further related to a roaming mode in the graph data, for example, roaming based on a depth-first traversal mode, or random roaming. A query plan tree is generated based on the query request, and the query plan tree can provide a corresponding configuration attribute that is used to define a mode. In this case, a roaming mode can be predefined in the query plan tree, and the next search path is further determined based on the identifier of the peer node and the query plan tree. Here, the query plan tree is optional, and the next search path can be independently determined based on the information simplification topology graph.

In one or more embodiments of this specification, although the query request can indicate the query data that need to be returned, the user that sends the query request does not necessarily have a specific expectation on a specific form of the returned data, that is, the indication of the query request does not necessarily match an actual expectation of the user (the user issues the query request, but does not necessarily know a specific form in which a result is returned). Based on this, the solution predicts and infers the actual expectation of the user to determine whether to delay the materialization operation, or even not perform the materialization operation, without entirely depending on the indication of the query request. In this way, the actual expectation of the user can be met while the adverse impact of the materialization operation is minimized, and the improper indication of the query request can be actively corrected.

Specifically, for example, regardless of a determining result of S108, at least a real-time quantity of the target nodes can be first returned in a case in which a materialization operation is not performed on the node (instead of returning the real-time quantity of the target nodes after all the target nodes are determined, the process can be dynamically changed), as minimum corresponding query data. In addition, a real-time page status of a front-end page corresponding to the query request (namely, an interaction page at an end of the user that sends the query) can be detected, and whether the real-time page status meets a predetermined user concentration condition is determined. If yes, the target node that has returned corresponding query data (the minimum corresponding query data) is materialized, and supplementing and returning are performed based on a result of the materialization in response to the query request. The user concentration condition reflects that the user attaches importance to and focuses on this query, or there is a high probability that the user expects to return more detailed query data, for example, query data that includes the value information of the target node. By detecting the real-time page status, an instant and/or recent operation and reflection of the user on the page can be inferred, for example, whether the user has consecutively performed a plurality of queries, whether a correlation between the plurality of queries of the user is close or progressive, whether the user has stayed on the front-end page of the query for long time, whether the user has actively copied a previous detailed query result, a different in browsing time of the user of a detailed query result and a simplified query result, and whether there is an unrelated page repeatedly switching to the front-end during the plurality of queries. Based on these features, it can be predicted, whether the user concentration condition is met, and further, it can be determined whether to actively supplement the materialized query data, even an indication based on the query request. It is temporarily determined that materialization does not need to be performed, and finally supplemental materialization returning is still delayed. Therefore, user experience is improved, and fault tolerance of a query result in terms of user experience is improved.

Further, because the returning based on a materialization result is delayed, blank time in which the user needs to wait increases, and the blank time is actively filled, to avoid passive waiting of the user, so that an entire querying and result returning process is smoother, more comprehensive, and more efficient from a user perspective. The active filling operation focuses on making the user feel that this is natural, attractive, and not redundant. That is, although a delay substantially occurs, the user does not consider this to be a delay.

Based on this idea, specifically, for example, for the target node that has returned corresponding query data (a corresponding querying process avoids a materialization operation and ensures efficiency), a corresponding roam trajectory that reflects an edge search is pushed to the front-end page, and the user is prompted to select an intermediate node or a target node from the roam trajectory, so as to select at least a part of the intermediate node or the target node to materialize in a roam trajectory display process and a selection process of the user. If a selection operation of the user is received, the corresponding materialization result is supplemented and returned. In the display and selection processes (in this case, a minimum query result has been returned), the materialization can be started in parallel, so that after the user performs selection, a matching supplementary result is selected and returned in time. If the user does not perform selection, all the materialization results can be returned. This solution meets flexible and variable needs of the user, enhances a sense of handling of the user, helps the user obtain a more accurate and non-redundant query result in a phase, and makes it difficult for the user to detect a delay of a materialization operation. Query efficiency and the actual expectation of the user for the query result are considered.

Figure 3:
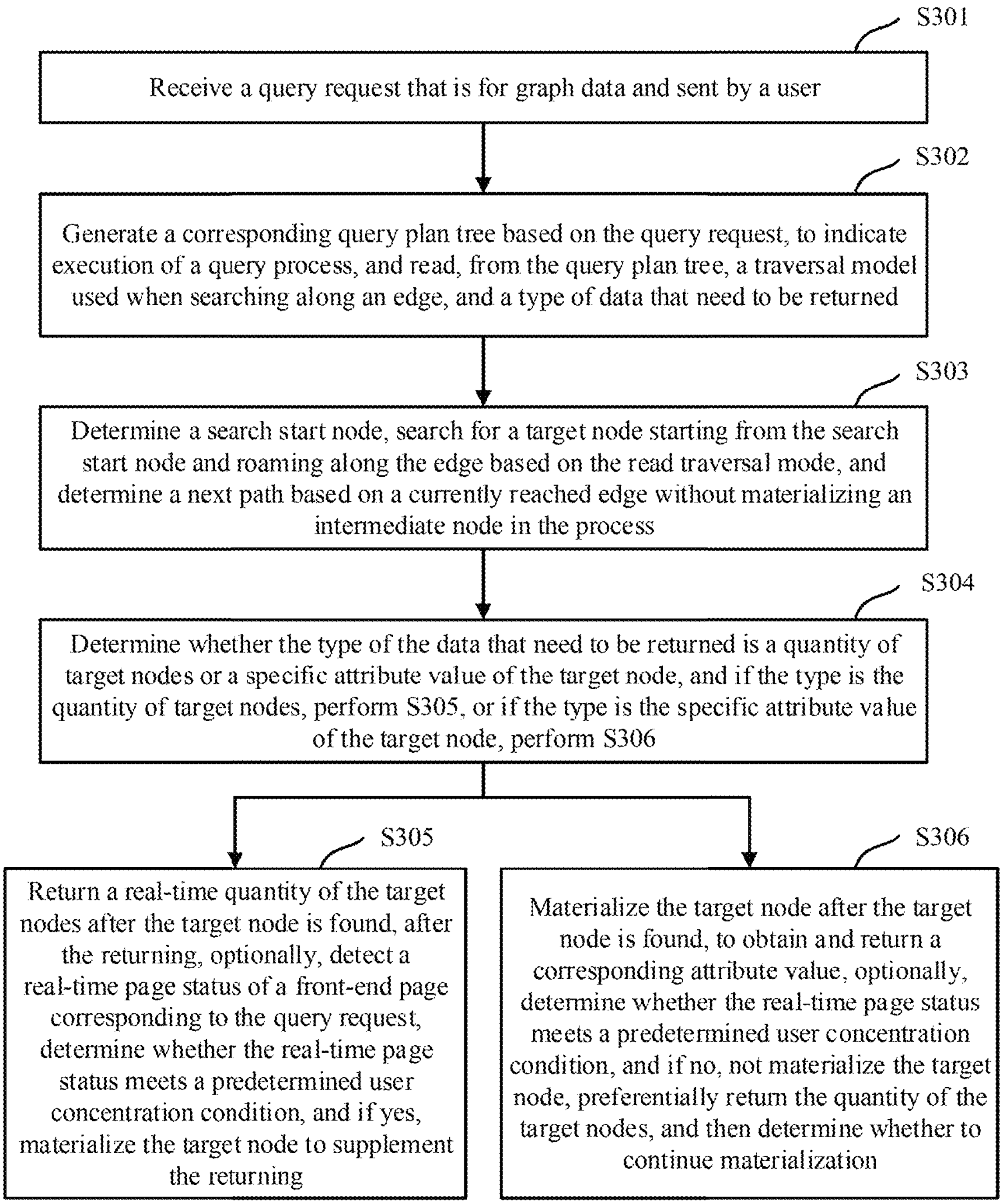
FIG. 3 is a schematic flowchart illustrating a specific implementation of the method in FIG. 1 in an application scenario, according to one or more embodiments of this specification.

According to the above-mentioned descriptions, one or more embodiments of this specification further provide a schematic flowchart illustrating a specific implementation of the method in FIG. 1 in an application scenario, as shown in FIG. 3. In the scenario, a k-hop query is performed based on a Cypher statement, and a specific execution process of the query is improved based on the above-mentioned idea.

A template of a used Cypher statement is as follows:

MATCH (a { })→(b) RETURN count (DISTINCT b); and

MATCH (a { })→(b) RETURN sum (b.weight).

In the first query statement, only the quantity of target nodes needs to be returned, but before an improvement, a large quantity of materialization operations still need to be performed as described in the background.

The k-hop query is optimized, a next path is searched for by obtaining information about an edge during graph traversal, and traversal is continuously repeated until all target nodes are found. In this process, the intermediate node is not materialized, and whether the target node needs to be materialized depends on data that need to be returned in the query. If a quantity of the target nodes needs to be returned, as described in the above-mentioned first query statement, a quantity of nodes is obtained by calculating a quantity of edges, to avoid a materialization operation on the target node. However, if the value information of the target node needs to be returned, as described in the above-mentioned second query statement, a sum of specific attribute values of the nodes needs to be returned. In this case, materialization can be performed on the target node to obtain the attribute value. At the same time, when the query statement is considered, the actual expectation of the user is predicted to determine how to delay the materialization or whether the materialization result needs to be supplemented.

The procedure in FIG. 3 can include the following steps S301 to S306.

S301: Receive a query request that is for graph data and sent by a user.

S302: Generate a corresponding query plan tree based on the query request, to indicate execution of a querying process, and read, from the query plan tree, a traversal mode (for example, depth-first traversal) used when searching along an edge, and a type of data that need to be returned.

S303: Determine a search start node, search for a target node starting from the search start node and roaming along the edge based on the read traversal mode, and determine a next path based on a currently reached edge without materializing an intermediate node in the process.

S304: Determine whether the type of the data that need to be returned is a quantity of target nodes or a specific attribute value of the target node, and if the type is the quantity of target nodes, perform S305, or if the type is the specific attribute value of the target node, perform S306.

S305: Return a real-time quantity of the target nodes after the target node is found, after the returning, optionally, detect a real-time page status of a front-end page corresponding to the query request, determine whether the real-time page status meets a predetermined user concentration condition, and if yes, materialize the target node to supplement the returning.

S306: Materialize the target node after the target node is found, to obtain and return a corresponding attribute value, optionally, determine whether the real-time page status meets a predetermined user concentration condition, and if no, not materialize the target node, preferentially return the quantity of the target nodes, and then determine whether to continue materialization.

Based on the solution in FIG. 3, query performance of the k-hop query is effectively improved, and some test data reflect that consumed time is reduced to one fifth of the previous time when the quantity of the target nodes is queried.

Figure 4:
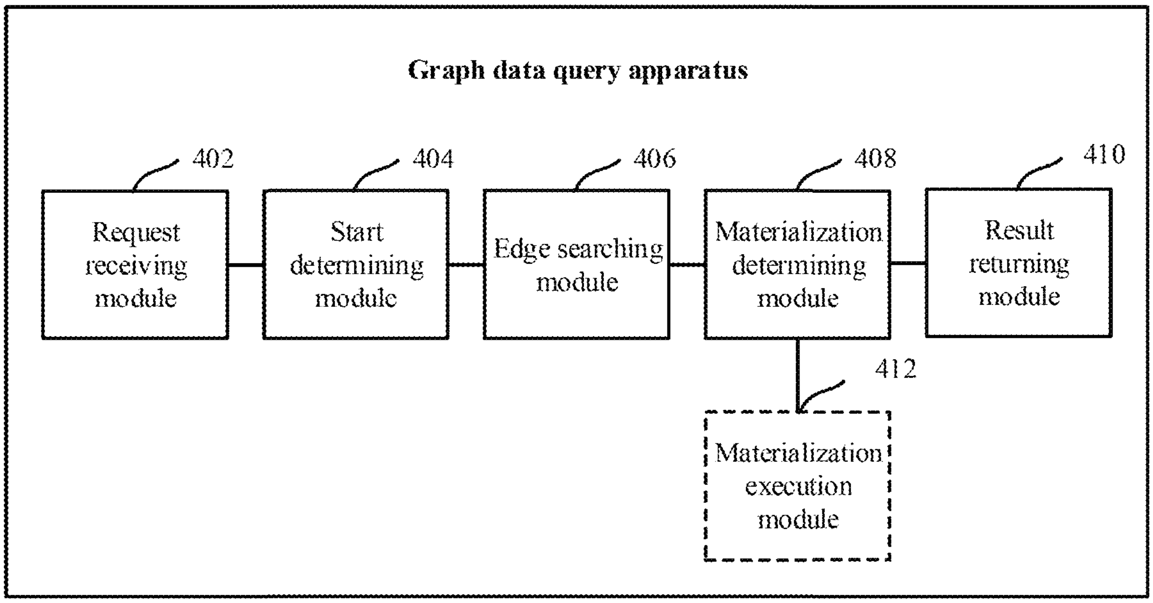
FIG. 4 is a structural diagram illustrating a graph data query apparatus, according to one or more embodiments of this specification.
Figure 5:
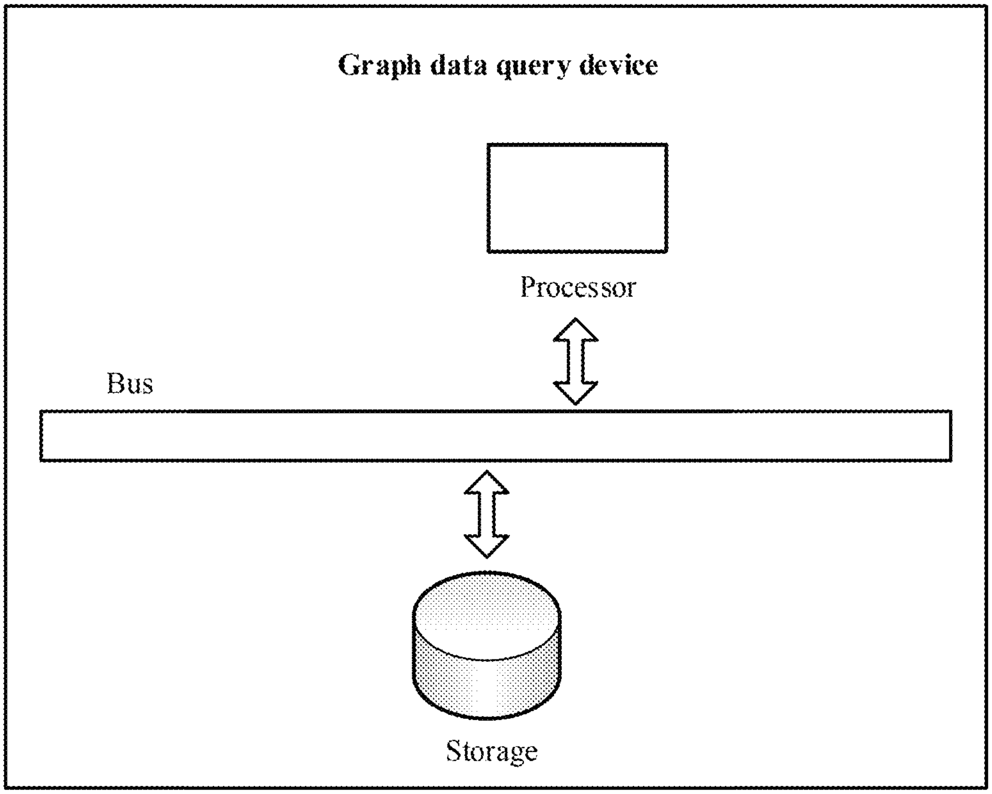
FIG. 5 is a structural diagram illustrating a graph data query device, according to one or more embodiments of this specification.

Based on a same idea, one or more embodiments of this specification further provide apparatuses and devices corresponding to the above-mentioned methods. As shown in FIG. 4 and FIG. 5, a dashed block represents an optional module.

FIG. 4 is a structural diagram illustrating a graph data query apparatus, according to one or more embodiments of this specification. The apparatus includes: a request receiving module 402, configured to receive a query request for graph data; a start determining module 404, configured to determine a search start node in the graph data; an edge searching module 406, configured to search, starting from the search start node and along an edge in the graph data, the graph data for a target node that meets the query request; a materialization determining module 408, configured to determine, based on query data that need to be returned in response to the query request, whether the target node needs to be materialized; and a result returning module 410, configured to: if no, return corresponding query data when the target node does not need to be materialized.

Optionally, the apparatus further includes a materialization execution module 412. The materialization execution module 412 is configured to: after the determining whether the target node needs to be materialized, if a result of the determining is yes, materialize the target node to obtain value information of the target node; and the result returning module 410 is configured to return corresponding query data based on the value information of the target node.

Optionally, the materialization determining module 408 is configured to: for the query data that need to be returned in response to the query request, determine, based on whether the query data depend on value information of the target node, whether the target node needs to be materialized. If the query data do not depend on the value information of the target node, a result of the determining is no.

Optionally, the materialization determining module 408 is configured to: if the query data that need to be returned in response to the query request are a quantity of target nodes, determine that the target node does not need to be materialized.

Optionally, the edge searching module 406 is configured to: perform depth-first searching in the graph data starting from the search start node and along the edge in the graph data; and determine a next search path based on an edge that is reached in the graph data, without materializing an intermediate node connected to the edge, where the intermediate node is not the target node.

Optionally, the edge searching module 406 is configured to: obtain an information simplification topology graph prebuilt based on the graph data, where the information simplification topology graph includes an identifier of a node; determine, based on the information simplification topology graph, an identifier of a peer node associated with the edge that is reached in the graph data; determine a query plan tree generated based on the query request; and determine the next search path based on the identifier of the peer node and the query plan trec.

Optionally, the result returning module 410 is configured to: in a process of determining the target nodes, dynamically return a real-time quantity of determined target nodes as corresponding query data; detect a real-time page status of a front-end page corresponding to the query request, and determine whether the real-time page status meets a predetermined user concentration condition; and if yes, materialize a target node that has returned corresponding query data, and perform, based on a result of the materialization, supplementing and returning in response to the query request.

Optionally, the result returning module 410 is configured to: for the target node that has returned corresponding query data, push, to the front-end page, a corresponding roam trajectory that reflects an edge search, and prompt a user to select an intermediate node or a target node from the roam trajectory, so as to select at least a part of the intermediate node or the target node to materialize in a roam trajectory display process and a selection process of the user; and if a selection operation of the user is received, supplement and return a corresponding materialization result.

Optionally, the search start node is specified in the query request. The query request is used to request to search: a quantity or value information of nodes that are specified hops away from the search start node, where the nodes that are specified hops away from the search start node are used as the target node.

Optionally, a node in the graph data represents at least one of the following objects: a user, a user feature, a service feature, or a transaction.

FIG. 5 is a structural diagram illustrating a graph data query device, according to one or more embodiments of this specification. The device includes at least one processor and a storage that is communicatively connected to the at least one processor.

The storage stores instructions that are capable of being executed by the at least one processor, and the instructions are executed by the at least one processor, so that the at least one processor is capable of: receiving a query request for graph data; determining a search start node in the graph data; searching, starting from the search start node and along an edge in the graph data, the graph data for a target node that meets the query request; determining, based on query data that need to be returned in response to the query request, whether the target node needs to be materialized; and if no, returning corresponding query data when the target node does not need to be materialized.

The processor can communicate with the storage through a bus, and the device can further include an input/output interface that communicates with another device.

Based on a same idea, one or more embodiments of this specification further provide a nonvolatile computer storage medium corresponding to the method in FIG. 1. The nonvolatile computer storage medium stores computer-executable instructions, and the computer-executable instructions are set to: receive a query request for graph data; determine a search start node in the graph data; search, starting from the search start node and along an edge in the graph data, the graph data for a target node that meets the query request; determine, based on query data that need to be returned in response to the query request, whether the target node needs to be materialized; and if no, return corresponding query data when the target node does not need to be materialized.

In the 1990*s*, whether a technical improvement is a hardware improvement (for example, an improvement to a circuit structure, like a diode, a transistor, or a switch) or a software improvement (an improvement to a method procedure) can be clearly distinguished. However, with development of technologies, an improvement to many existing method procedures can be considered as a direct improvement to hardware circuit structures. Almost all designers program an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer independently performs programming to "integrate" a digital system to a PLD without requesting a chip manufacturer to design and manufacture an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs instead of only one HDL, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

The controller can be implemented in any suitable way. For example, the controller can be in a form like a microprocessor, a processor, or a computer-readable medium, a logic gate, a switch, an application-specific integrated circuit (ASIC), a programmable logic controller, or an embedded microcontroller storing computer-readable program code (for example, software or firmware) that can be executed by the (micro) processor. Examples of the controller include but are not limited to the following microcontrollers: ARC 625D, Atmel AT91SAM, Microchip PIC18F26K20, and Silicone Labs C8051F320. A storage controller can also be implemented as a part of control logic of the storage. A person skilled in the art also knows that in addition to implementing the controller by using only the computer-readable program code, logic programming can be performed on method steps to enable the controller to implement the same function in a form of a logic gate, a switch, an application-specific integrated circuit, a programmable logic controller, an embedded microcontroller, etc. Therefore, the controller can be considered as a hardware component, and an apparatus configured to implement various functions in the controller can also be considered as a structure in the hardware component. Alternatively, the apparatus configured to implement various functions can even be considered as both a software module implementing the method and a structure in the hardware component.

The systems, apparatuses, modules, or units described in the above-mentioned embodiments can be specifically implemented by a computer chip or an entity, or can be implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For case of description, the above-mentioned apparatus is described by dividing functions into various units. Certainly, during implementation of this specification, functions of units can be implemented in the same or more software and/or hardware.

A person skilled in the art should understand that the embodiments of this specification can be provided as methods, systems, or computer program products. Therefore, the embodiments of this specification can use a form of hardware only embodiments, software only embodiments, or embodiments with a combination of software and hardware. In addition, a form of a computer program product that is implemented on one or more computer-usable storage media (including but not limited to a disk storage, a CD-ROM, an optical storage, etc.) that include computer-usable program code can be used in the embodiments of this specification.

This specification is described with reference to a flowchart and/or block diagram of the method, the device (system), and the computer program product according to embodiments of this specification. It should be understood that computer program instructions can be used to implement cach procedure and/or each block in the flowcharts and/or the block diagrams and a combination of a procedure and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions can also be stored in a computer-readable memory that can indicate a computer or another programmable data processing device to work in a specific way, so that an instruction stored in the computer-readable memory generates a manufacturer including an instruction apparatus, and the instruction apparatus implements a function specified in one or more procedures in a flowchart and/or one or more blocks in a block diagram.

These computer program instructions can alternatively be loaded onto a computer or another programmable data processing device, so that a series of operations and steps are performed on the computer or the another programmable device to generate computer-implemented processing. Therefore, the instructions executed on the computer or the another programmable device provide steps for implementing a specific function in one or more procedures in the flowcharts and/or in one or more blocks in the block diagrams.

In a typical configuration, a computing device includes one or more processors (CPUs), one or more input/output interfaces, one or more network interfaces, and one or more memories.

The memory may be in a form like a non-permanent memory, a random access memory (RAM), and/or a non-volatile memory in a computer-readable medium, for example, a read-only memory (ROM) or a flash memory (flash RAM). The memory is an example of the computer-readable medium.

Computer-readable media, including permanent and non-permanent, removable and non-removable media, can be implemented by any method or technology for information storage. The information can be computer-readable instructions, a data structure, a program module, or other data. Examples of the computer storage medium include but are not limited to a phase change random access memory (PRAM), a static random access memory (SRAM), a dynamic random access memory (DRAM), another type of random access memory (RAM), a read-only memory (ROM), an electrically crasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be configured to store information that can be accessed by a computing device. As specified in this specification, the computer-readable medium does not include transitory computer-readable media (transitory media), such as a modulated data signal and carrier.

It is worthwhile to further note that the terms "include", "comprise", or any other variant thereof are intended to cover a non-exclusive inclusion, so that a process, a method, a product, or a device that includes a list of elements not only includes those elements but also includes other elements that are not expressly listed, or further includes elements inherent to such a process, method, product, or device. Without more constraints, an element preceded by "includes a . . . " does not preclude the existence of additional identical elements in the process, method, product, or device that includes the element.

This specification can be described in a general context of computer-executable instructions executed by a computer, for example, a program module. Generally, the program module includes a routine, a program, an object, a component, a data structure, etc. executing a specific task or implementing a specific abstract data type. This specification can alternatively be practiced in distributed computing environments. In the distributed computing environments, tasks are executed by remote processing devices connected through a communication network. In the distributed computing environments, the program module can be located in both local and remote computer storage media including storage devices.

The embodiments of this specification are described in a progressive way. For same or similar parts in the embodiments, refer to each other. Each embodiment focuses on a difference from other embodiments. Particularly, the apparatus, device, and nonvolatile computer storage medium embodiments are basically similar to the method embodiment, and therefore is briefly described. For a related part, refer to some descriptions in the method embodiment.

Specific embodiments of this specification are described above. Other embodiments fall within the scope of the appended claims. In some cases, the actions or steps described in the claims can be performed in an order different from that in the embodiments, and the desired results can still be achieved. In addition, the process depicted in the accompanying drawings does not necessarily require a particular sequence or sequential sequence shown to achieve the desired result. In some implementations, multi-tasking and concurrent processing are feasible or can be advantageous.

The above-mentioned content is merely one or more embodiments of this specification, and is not intended to limit this specification. A person skilled in the art knows that one or more embodiments of this specification can have various modifications and changes. Any modification, equivalent replacement, improvement, etc. made within the spirit and principle of one or more embodiments of this specification shall fall within the scope of the claims of this specification.

What is claimed is:

1. A computer-implemented method for graph data query, comprising:

receiving a query request for graph data;

determining a search start node in the graph data;

searching, starting from the search start node and along an edge in the graph data, the graph data for a target node that meets the query request, wherein searching, starting from the search start node and along an edge in the graph data, the graph data for a target node that meets the query request, comprises:

searching, starting from the search start node, the graph data along the edge in the graph data; and determining a next search path based on an edge that is reached in the graph data without materializing an intermediate node connected to the edge, wherein the intermediate node is not the target node, wherein materializing comprises retrieving, based on an index, value information of a node from a memory or a disk, wherein determining the next search path comprises:

obtaining an information simplification topology graph prebuilt based on the graph data, wherein the information simplification topology graph comprises an identifier of a node:

determining, based on the information simplification topology graph, an identifier of a peer node associated with the edge that is reached in the graph data;

determining a query plan tree generated based on the query request; and determining the next search path based on the identifier of the peer node and the query plan tree;

determining, based on query data that needs to be returned in response to the query request, whether the target node needs to be materialized; and in response to a determination that the target node does not need to be materialized, returning corresponding query data without materializing the target node, and in response to a determination that the target node needs to be materialized, materializing the target node to obtain the value information of the target node and returning corresponding query data based on the value information of the target node.

2. The computer-implemented method of claim 1, wherein, after determining whether the target node needs to be materialized:

in response to a determination that the target node does need to be materialized:

materializing the target node to obtain value information of the target node; and returning corresponding query data based on the value information of the target node.

3. The computer-implemented method of claim 1, wherein determining, based on query data that needs to be returned in response to the query request, whether the target node needs to be materialized, comprises:

for the query data that needs to be returned in response to the query request, determining, based on whether the query data depends on value information of the target node, whether the target node needs to be materialized, wherein, in response to a determination that the query data does not depend on the value information of the target node, a result of the determining is that the target node does not need to be materialized.

4. The computer-implemented method of claim 1, wherein determining, based on query data that needs to be returned in response to the query request, whether the target node needs to be materialized comprises:

in response to a determination that the query data that needs to be returned in response to the query request is a quantity of target nodes, determining that the target node does not need to be materialized.

5. The computer-implemented method of claim 1, wherein the information simplification topology graph is partially consistent with an original topology graph represented by the graph data, wherein the information simplification topology graph is built based on a plurality of different graph data, and wherein the information simplification topology graph comprises a local area in each graph data; and determining the next search path based on the identifier of the peer node and the query plan tree, comprises:

in response to a determination that the edge that is reached in the graph data is capable of being extended to the information simplification topology graph, determining the next search path in the local area in the information simplification topology graph.

6. The computer-implemented method of claim 5, wherein determining the next search path in the local area in the information simplification topology graph, comprises:

determining whether a search path reaches a boundary of a local area in which the search path is located, wherein the local area belongs to another graph data; and in response to a determination that the search path reaches a boundary of a local area in which the search path is located, determining, based on a relationship between current graph data and the another graph data, whether to perform a graph jump.

7. The computer-implemented method of claim 6, comprising:

in response to a determination that the graph jump is to be performed, jumping from the local area to another area in the another graph data to continue to determine the next search path.

8. The computer-implemented method of claim 1, wherein returning corresponding query data, comprises:

in a process of determining target nodes, dynamically returning a real-time quantity of determined target nodes as corresponding query data.

9. The computer-implemented method of claim 8, comprising:

detecting a real-time page status of a front-end page corresponding to the query request.

10. The computer-implemented method of claim 9, comprising:

determining whether the real-time page status meets a predetermined user concentration condition.

11. The computer-implemented method of claim 10, comprising:

in response to a determination that the real-time page status meets a predetermined user concentration condition:

materializing a target node that has returned corresponding query data; and performing, based on a result of the materialization, supplementing and returning in response to the query request.

12. The computer-implemented method of claim 11, wherein materializing a target node that has returned corresponding query data, comprises:

for the target node that has returned corresponding query data:

pushing, to the front-end page, a corresponding roam trajectory that reflects an edge search; and prompting a user to select an intermediate node or a target node from the corresponding roam trajectory, so as to select at least a part of the intermediate node or the target node to materialize in a roam trajectory display process and a selection process of the user.

13. The computer-implemented method of claim 12, comprising:

in response to a determination that a selection operation of the user is received, supplementing and returning a corresponding materialization result.

14. The computer-implemented method of claim 1, wherein:

the search start node is specified in the query request.

15. The computer-implemented method of claim 14, wherein:

the query request is used to request to search a quantity or value information of nodes that are specified hops away from the search start node, wherein the nodes that are specified hops away from the search start node are used as the target node.

16. The computer-implemented method of claim 1, wherein a node in the graph data represents at least one of a user, a user feature, a service feature, or a transaction.

17. A non-transitory, computer-readable medium storing one or more instructions executable by a computer system to perform one or more operations for graph data query, comprising:

receiving a query request for graph data;

determining a search start node in the graph data;

searching, starting from the search start node and along an edge in the graph data, the graph data for a target node that meets the query request, wherein searching, starting from the search start node and along an edge in the graph data, the graph data for a target node that meets the query request, comprises:

searching, starting from the search start node, the graph data along the edge in the graph data; and determining a next search path based on an edge that is reached in the graph data without materializing an intermediate node connected to the edge, wherein the intermediate node is not the target node, wherein materializing comprises retrieving, based on an index, value information of a node from a memory or a disk, wherein determining the next search path comprises:

obtaining an information simplification topology graph prebuilt based on the graph data, wherein the information simplification topology graph comprises an identifier of a node;

determining, based on the information simplification topology graph, an identifier of a peer node associated with the edge that is reached in the graph data;

determining a query plan tree generated based on the query request; and determining the next search path based on the identifier of the peer node and the query plan tree;

determining, based on query data that needs to be returned in response to the query request, whether the target node needs to be materialized; and in response to a determination that the target node does not need to be materialized, returning corresponding query data without materializing the target node, and in response to a determination that the target node needs to be materialized, materializing the target node to obtain the value information of the target node and returning corresponding query data based on the value information of the target node.

18. A computer-implemented system for graph data query, comprising:

one or more computers; and one or more computer memory devices interoperably coupled with the one or more computers and having tangible, non-transitory, machine-readable media storing one or more instructions that, when executed by the one or more computers, perform one or more operations, comprising:

receiving a query request for graph data;

determining a search start node in the graph data;

searching, starting from the search start node and along an edge in the graph data, the graph data for a target node that meets the query request, wherein searching, starting from the search start node and along an edge in the graph data, the graph data for a target node that meets the query request, comprises:

searching, starting from the search start node, the graph data along the edge in the graph data; and determining a next search path based on an edge that is reached in the graph data without materializing an intermediate node connected to the edge, wherein the intermediate node is not the target node, wherein materializing comprises retrieving, based on an index, value information of a node from a memory or a disk, wherein determining the next search path comprises:

obtaining an information simplification topology graph prebuilt based on the graph data, wherein the information simplification topology graph comprises an identifier of a node;

determining, based on the information simplification topology graph, an identifier of a peer node associated with the edge that is reached in the graph data;

determining a query plan tree generated based on the query request; and determining the next search path based on the identifier of the peer node and the query plan tree;

determining, based on query data that needs to be returned in response to the query request, whether the target node needs to be materialized; and in response to a determination that the target node does not need to be materialized, returning corresponding query data without materializing the target node, and in response to a determination that the target node needs to be materialized, materializing the target node to obtain the value information of the target node and returning corresponding query data based on the value information of the target node.

* * * * *